J. G. WALLACE.
WELDING.
APPLICATION FILED FEB. 16, 1915.
1,190,610.
Patented July 11, 1916.
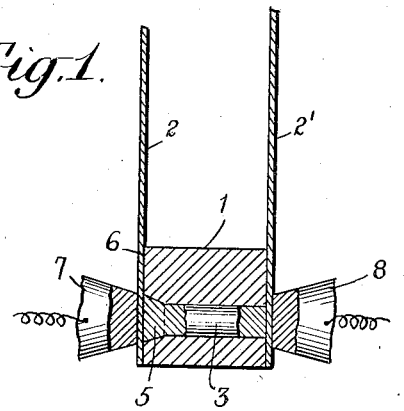
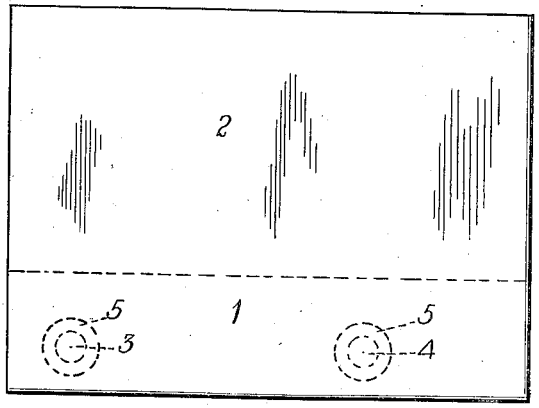
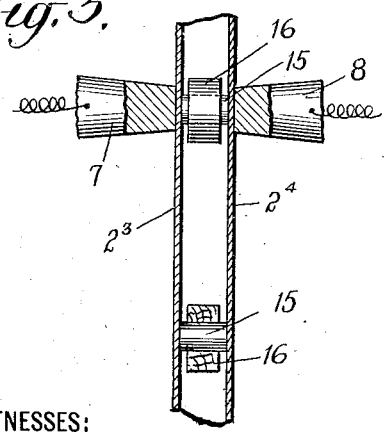
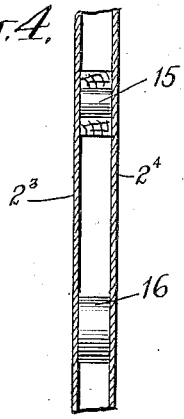
WITNESSES:
INVENTOR
John G. Wallace
BY
ATTORNEYS

UNITED STATES PATENT OFFICE.

JOHN G. WALLACE, OF PHILADELPHIA, PENNSYLVANIA, ASSIGNOR TO HALE & KILBURN COMPANY, OF PHILADELPHIA, PENNSYLVANIA, A CORPORATION OF DELAWARE.

WELDING.

1,190,610. Specification of Letters Patent. Patented July 11, 1916.

Application filed February 16, 1915. Serial No. 8,609.

*To all whom it may concern:*

Be it known that I, JOHN G. WALLACE, a citizen of the United States, residing at Philadelphia, in the county of Philadelphia and State of Pennsylvania, have invented certain new and useful Improvements in Welding, of which the following is a specification.

My invention relates to improvements in the art of welding, and is particularly directed to the production of an improved article of manufacture comprising a pair of metallic plates secured together in spaced relation with a strip or strips of wood or other non-conducting, non-vibratory material firmly secured to and between the metallic plates, metallic rods extending through the said spacing-strips and being welded at their ends to the metallic plates.

The objects of my invention are to devise an improved process for producing such articles, my invention also comprising the articles made by such processes as new articles of manufacture.

I have found it advisable in some situations to secure a strip or strips of wood or other non-vibratory or vibration-deadening material between metallic plates, either at the edges of the plates or in other positions between the plates. This may be of use where metallic plates are to be secured together in spaced relation in the construction of railway-car and automobile bodies and the like. Various processes have heretofore been proposed for welding or securing together such plates in parallel or other spaced relation, metallic plates being thus joined, for example, by means of conducting metallic spacing members, such as bars of channel-section interposed between the same and welded thereto.

By my invention, it is made possible to separate the metallic plates by wooden or other non-vibratory spacing strips or blocks, metallic rods passing through the spacing member or members and being welded at their ends to the adjacent surfaces of the metallic plates, which latter are in close contact with the wooden strips. By this means vibration which may be set up in one metallic member, for example an outer plate of a car construction, is not transmitted in full extent to the other or inner member of the construction. Another advantage accruing from my improved process is that the wooden spacing-strips afford a firm and solid bearing for the welding apparatus during the process of welding, the welding action being localized on the metallic rod or rods of comparatively small cross-section extending through the spacing strip. In previous methods of welding together metallic plates in spaced relation, difficulties have been met both in concentrating the welding action within a small area and at the same time affording a sufficient bearing for the apparatus to prevent crushing or bending the plates.

My invention, therefore, provides the desirable results of not only securing together metallic plates in parallel or other spaced relation, but also provides a closely joined construction in which non-vibratory members form the contacting bearings between the metallic plates, whereby the transmission of vibration from one plate to the other is deadened. It may also be noted that where strips of wood or the like are thus secured between plates adjacent the edge portions of the same, the wooden strip may serve as a tacking strip to which upholstery or other parts may be secured, in automobile or car or other construction. By extending metallic rods through the non-conducting spacing strips and welding the ends of the rods to the metallic plates, in such manner that the inner surfaces of the plates are finally brought into close contact with the adjacent surfaces of the spacing strips, not only are the plates and strips closely and effectively secured together, but there is the further advantage that the outer surfaces of the plates are unmarred and there is no metal to be removed by a subsequent operation, as there would be if the wooden strip were secured to the plates by rivets, the ends of which would have subsequently to be filed down flush with the surfaces of the plates.

In order that my invention may be more clearly understood, attention is hereby directed to the accompanying drawing, forming part of this specification and illustrating the manner in which the same may be carried out.

In the drawings, Figure 1 represents a cross-section through a pair of metallic plates which are being secured together with a wooden spacing strip interposed between the same; Fig. 2 is a plan view of the same; and Figs. 3 and 4 are cross-sections through a pair of panel-sheets to be secured together with steel spuds passing through wooden spacing strips or blocks, showing the construction respectively before and after welding.

Referring to the drawings, the wooden strip 1 is shown in Figs. 1 and 2 as being secured to and between metallic plates 2 and 2' adjacent to one edge thereof. In this relation it may be useful, among other purposes, to serve as a tacking strip, to which upholstery may be secured in the construction of automobile bodies or the like, or as a hand-rail for the same. Metallic rods 3 and 4 are driven through strip 1 or extended through previously drilled holes in the strip 1, these rods having, if desired, heads 5 seated in countersunk recesses formed in the face 6 of the strip 1. It is not essential that the enlarged heads 5 with their corresponding recesses be provided; it may, however, be deemed desirable. Rods 3, 4 are preferably of a length slightly greater than the thickness of the strip 1, although they may be of a length substantially equal to the thickness of the strip. The strip is positioned between plates 2 and 2' with the ends of the metallic rods in contact with the surfaces of the plates and the contacts 7 and 8 of a suitable welding machine are brought in contact, under sufficient pressure, with the outer surfaces of the plates in line with or adjacent to the opposite ends of the rod. Upon the passage of a suitable welding current through the rod and the plates, the plates and rod are welded firmly together, the operation then being repeated as many times as there are rods extending through the strip. The heads 5 of the rods, which may be provided, if desired, on either or both ends of the rods, will tightly fit within their recesses in the strip 1, after the completion of the welding, and aid in holding the strip closely positioned against the plates. Usually, as stated, the rods 3 and 4 are somewhat longer than the thickness of the strip 1 and may have conically pointed ends or ends of reduced cross-section, which are placed in contact with plate 2' if enlarged heads 5 are used on the rods in contact with plate 2, or with pointed ends at both extremities of the rods in contact with the adjacent surfaces of both plates. When the welding current and pressure are applied, the pointed ends of the rods melt sufficiently to flow, under the pressure, to fill the ends of the openings through which the rods extend in strip 1, the heads 5 of the rods, if used, then seating tightly within their recesses in face 6 of strip 1. As many rods may be used, extending through the strip, as is found necessary in practice, the welding operation resulting in the welding of the plates to the opposite ends of the rods with the wooden strip or strips or blocks firmly held in contact with the two plates.

In Figs. 3 and 4, metallic plates $2^3$ and $2^4$ are secured together in similar manner to that described in connection with Figs. 1 and 2 of the drawings, steel spuds 15 extending through wooden members 16, spuds 15 being welded to the panels and being shortened in length under the welding action so that the panels are brought into tight contact with the wooden pieces. If it is found desirable, the ends of the steel spuds 15 may be conically pointed or reduced in cross-section, as referred to in connection with Fig. 1.

Having now described my invention, what I claim as new therein and desire to secure by Letters Patent is as follows:—

1. The process of welding consisting in passing through a spacing member of non-conducting, vibration-absorbing material, conducting metallic rods of a length at least equal to the thickness of said member, interposing said member between metallic plates with the ends of said rods in contact with the adjacent surfaces of said plates, and passing a welding current through said plates and rods and simultaneously exerting a suitable welding pressure on the same to weld the same together and cause close contact of said plates and member, substantially as set forth.

2. The process of welding consisting in passing through wooden spacing strips conducting metallic rods of a length at least equal to the thickness of said strips, interposing said strips between metallic plates with the ends of said rods in contact with the adjacent surfaces of said plates and passing a welding current through said plates and rods while submitting the same to a suitable welding pressure, to weld the same together and cause close contact of said plates and spacing strips, substantially as set forth.

3. The process of welding consisting in passing through a wooden spacing-strip conducting metallic rods of a length somewhat greater than the thickness of said strip, said rods having end portions of reduced cross-section at one extremity thereof, interposing said strip between metallic plates with the ends of said rods in contact with the adjacent surfaces of said plates, and passing a welding current through said plates and rods while pressing the same together with a suitable welding pressure to weld the same together and to cause close contact of said plates and spacing-strip, substantially as set forth.

4. As a new article of manufacture, a pair of metallic plates having a strip of electrically non-conducting vibration-absorbing material secured to and between said plates by metallic rods extending through said strip, said rods being welded at their ends to the plates and said plates and strip being in close contact, substantially as set forth.

This specification signed and witnessed this 11th day of February, 1915.

JOHN G. WALLACE.

Witnesses:
WM. J. EARNSHAW,
WILLIAM J. CONWAY.